United States Patent [19]

Turner et al.

[11] Patent Number: 4,795,682
[45] Date of Patent: Jan. 3, 1989

[54] TIN-COBALT BEARING OVERLAY ALLOYS

[75] Inventors: Michael Turner, Hengelo Ov, Netherlands; John K. Dennis, Birmingham; David R. Eastham, Hemel Hempstead, both of England

[73] Assignee: AE PLC, Rugby, England

[21] Appl. No.: 72,532

[22] Filed: Jul. 13, 1987

[51] Int. Cl.⁴ .............................................. B32B 15/01
[52] U.S. Cl. .................................... 428/646; 384/912; 420/557; 428/647; 428/648
[58] Field of Search ............... 420/557, 558, 559, 560, 420/561, 672; 428/646, 647, 648; 384/912

[56] References Cited

U.S. PATENT DOCUMENTS 2,853,382  9/1958  Klochkov ........................... 420/562
3,881,919  5/1975  Hyner et al. ....................... 420/562
4,140,835  2/1979  Goddard et al. .................. 420/561
4,150,983  4/1979  Mori ................................... 420/559

FOREIGN PATENT DOCUMENTS 2054542  5/1972  Fed. Rep. of Germany ...... 420/559
2818099 11/1979  Fed. Rep. of Germany ...... 420/561
 223279 12/1984  Japan ................................. 420/558
 159797  3/1921  United Kingdom ............... 420/561

Primary Examiner—L. Dewayne Rutledge
Assistant Examiner—Robert L. McDowell
Attorney, Agent, or Firm—William R. Hinds

[57] ABSTRACT

Alloys of the type known as overlays for bearings are described. An overlay for a bearing comprises between 0.5 and 15 wt % of cobalt the balance being tin apart from incidental impurities.

4 Claims, 3 Drawing Sheets

TIN-COBALT BEARING OVERLAY ALLOYS

The present invention relates to alloys for use as bearing alloys and particularly to alloys known generally as overlay alloys.

Overlays are generally soft alloys deposited onto harder bearing alloys to produce a surface having compatibility and conformability with a co-operating shaft and also to provide a means of embedding debris particles to prevent damage to the shaft.

Alloys based on tin and lead have been proposed and used heretofor. Aluminium and copper-based alloys when plated with an overlay having a composition of Pb-10Sn have under engine operating conditions experienced diffusion of tin out of the overlay into either the underlying bearing alloy or into an interlayer between the bearing alloy substrate and the overlay. Such depletion of the alloying constituent, in this example tin, can cause problems such as lowering of corrosion-resistance, for example, or other degradation of the overlay properties. Many known overlay alloys are metallurgically unstable and are also relatively weak mechanically in resistance to fatigue.

It is an object of the present invention to provide a more metallurgically stable overlay alloy and which also has improved fatigue-resistance properties over other known overlay compositions based on tin or lead.

According to the present invention, an overlay alloy on a bearing consists of tin and between 0.5 and 15 wt% cobalt, apart from incidental impurities. Also in accordance with the invention, there is provided a bearing having an overlay, the overlay consisting essentially of tin and between 2.0 and 15 wt% cobalt, apart from incidental impurities.

Alloys according to the present invention have been found to possess fatigue strengths in excess of other known overlays whilst retaining the desirable properties of conformability and debris embeddability.

Metallurgical stability has also been found to be greatly superior to other known overlay alloys. Controlled tests have shown that over a period of time at temperatures simulating engine operating temperatures far from the overlay becoming depleted in cobalt the distribution of cobalt within the tin matrix has actually become more homogeneous.

A preferred range of cobalt in the overlay lies in the range from 2 to 8%.

The alloy is preferably deposited by electroplating.

In order that the present invention may be more fully understood examples will now be given by way of illustration only with reference to the accompanying drawings of which:

Figure 1:
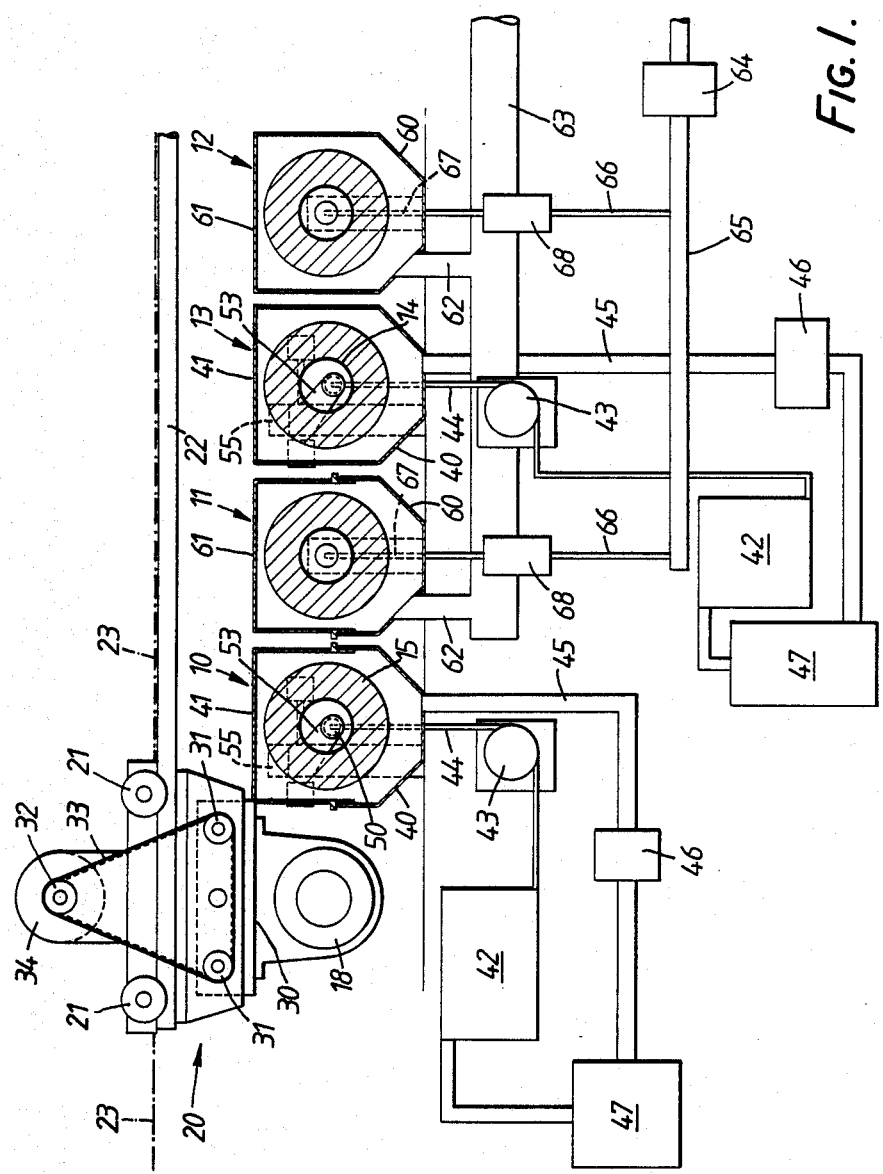
FIG. 1 shows a schematic part sectioned view of an apparatus set up to electro-deposit an overlay onto pairs of half bearings.
Figure 2:
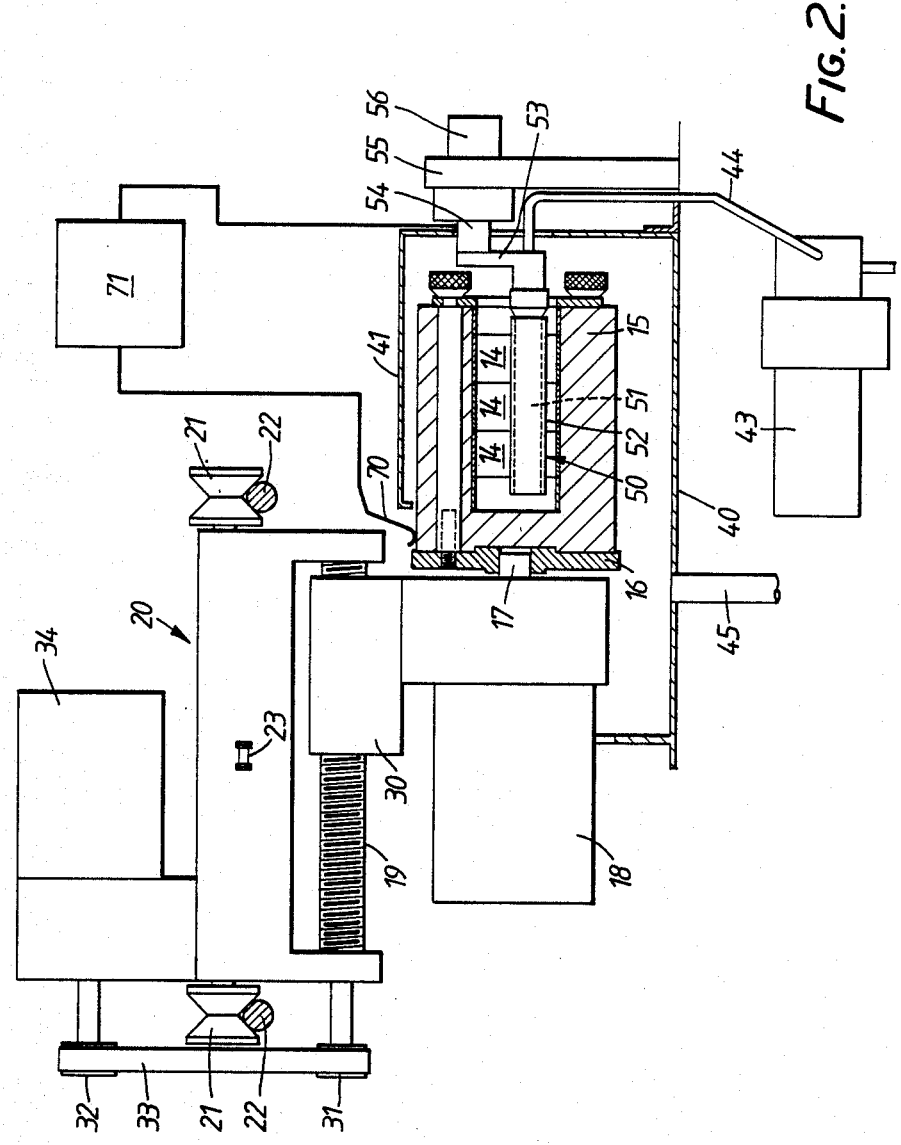
FIG. 2 shows a part sectioned side view through one of the tanks and its associated apparatus.
Figure 3:
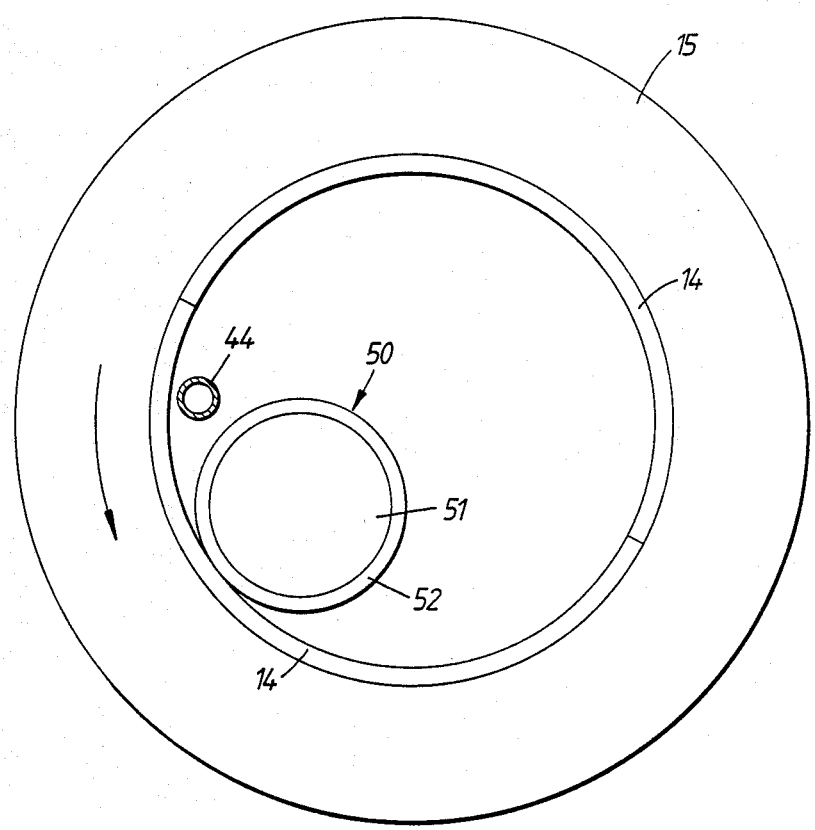
FIG. 3 shows a schematic general arrangement of the bearings to be plated and the plating electrodes etc.

Referring now to the drawings and where the same features are denoted by common reference numerals.

The apparatus comprises a clean and etch tank denoted generally at 10, wash tanks denoted generally at 11 and 12 and a brush plating tank denoted generally at 13. Bearings to be plated 14 are held in a jig 15 which is mounted on a plate 16 which is itself fixed to a shaft 17 of a motor 18. The motor 18 is mounted on threaded shafts 19 which are adapted to move the motor 18 and bearing jig 15 in a direction parallel to the axis of the motor shaft 17. The threaded shafts 19 are themselves part of a gantry 20 having grooved wheels 21 which co-operate with rails 22 which support the gantry 20 for transverse motion with respect to the row of tanks 10, 11, 12 and 13. The gantry 20 is moved along the rails 22 by a chain drive 23 which is controlled by sprockets driven by an electric motor (not shown) having known control means (not shown). The motor 18 is moved parallel to the direction of the shaft 17 by means of the threaded shafts 19 which co-operate with threaded holes in a mounting block 30. The motor is moved by rotation of the shafts 19 which are driven by pulleys 31 and 32 linked by a toothed belt 33, the pulley 32 being driven by an electric motor 34 having known control means (not shown). The clean and etch tank 10 and the plating tank 13 and their associated systems comprise lower collector troughs 40 and upper splash guards 41. Clean and etch or plating solutions are supplied to the tanks 10 and 13 from reservoirs 42 pumped at a controlled rate by peristaltic pumps 43 through conduits 44. Used solutions are returned to the reservoirs 42 from the collector troughs 40 via drain conduits 45, pumps 46 and refrigeration units 47. Solutions are supplied via the conduits 44 to a cylindrical plating brush 50 which comprises a central core 51 of graphite forming the anode the graphite being covered with a sleeve 52 of Selvyt cloth (trade mark). The anode may also comprise non-reactive metals such as, for example, platinum. The brush 50 is mounted on a swinging arm 53 which is pivoted on a shaft 54 held in a support pillar 55. Connected to the swinging arm 53 and brush 50 via the pivot shaft 54 is a motor and clutch unit 56 adapted to move the brush 50 through an arc to bring it into contact with the bore of the bearings 14 to be plated at a controlled load. The wash tanks 11 and 12 have lower collector troughs 60 and upper splash guards 61. The troughs 60 have drain conduits 62 connected to a manifold 63 to take away waste water. Clean wash water is supplied from a pump 64 via a manifold 65 to conduits 66. Water is allowed to access the bearings 14 through conduits 67 by operation of solenoid valves 68. Suitable electrical contacts 70 are provided to make the bearing surface cathodic. A known power supply 71 is also provided to control both voltage, current and time; the power supply 71 also has the facility to change polarity of the electrodes.

Operation of the above apparatus will now be described in relation to the deposition of a tincobalt overlay onto an aluminium-20 wt% tin-1 wt% copper bearing alloy. Bearings 14 of 53 mm dia and 30 mm length and comprising a steel backing having the stated aluminium alloy thereon were degreased in trichloroethylene and loaded into the jig 15 in three sets of two pairs effectively forming a cylindrical tube of bearings. The jig 15 was then assembled onto the plate 16 of the motor 18. With the mounting block 30/motor 18 at the furthest extent of its travel to the left on the threaded shafts 19 the gantry 20 was traversed along the rails 22 until the jig and bearings were opposite tank 10. The bearings 14 were then advanced into the clean and etch tank 10 to allow penetration of the brush 50 into the jig 15. The bearings were then rotated at 120 rev./min. with the bearings anodic at 9 volts whilst 10% hydrochloric acid was pumped into the region where the bearing surface and Selvyt cloth contacted. This was continued for 2 minutes at a current of about 8 amps. The polarity of the bearings was then reversed to cathodic and the process repeated for a further 2 minutes under the same conditions.

The bearings were then withdrawn from the tank 10 and the gantry 20 advanced to the wash tank 11 where they were rinsed with clean water with the bearings rotating at 40 rev./min. The bearings were then advanced to the plating tank 13 where they were plated with a Sn-Co overlay. The plating solution used comprised 50 gm/lit stannous sulphate, 40 gm/lit cobalt sulphate, 50 gm/lit sodium heptonate and the pH was adjusted to 2 by means of acetic acid. The jig and bearings were rotated at 120 rev./min. with a plating solution flow of approximately $0.2 \text{cm}^{3-1}$ sec. and a brush pressure of approximately 20 $\text{gm/cm}^{-2}$. The bearings were cathodic at a potential of about 15 v with an initial current flow of 8A rising to about 16A. The bearings were plated for a time sufficient to deposit between 20 and 25 um of overlay. The bearings were then rinsed in tank 12 and dried.

The resulting overlay possessed an average of 8% Co in the Sn matrix.

The resulting plated bearings were tested in a known "Sapphire" testing machine which measures the fatigue rating of the overlay. The testing schedule comprised the following procedure and conditions:
Shaft speed 2800 rev./min.
Initial load 62 MPa
Load increased after 20 hours at each load by 7 MPa until failure
Oil temperature 80° C.
Sinusoidal load pattern Test results of 97, 103, 103, 90 and 90 MPa were obtained on the bearings produced by the method described.

Further bearings were produced with an additional surface treatment of a zincate layer on the aluminium alloy surface but without an additional interlayer. Fatigue test results on the "Sapphire" machine gave ratings of 62, 62 and 76 MPa demonstrating an adverse effect of the zincate layer.

For the purposes of comparison the same Al-20Sn-1Cu alloy overlay plated with a known Pb-10Sn overlay by a known conventional electro-plating method in a fluoroborate-type bath with zincate and nickel interlayers gives a fatigue rating typically in the region of 70 MPa on a "Sapphire" test rig.

After plating by the method described the overlay alloy composition through the thickness was analysed by scanning electron microscopy. The overlay was found to have a relatively high concentration of Co near to the interface with the aluminium alloy and a lower concentration of about 2% Co at the overlay surface. An overlay-plated bearing of the above specification was heat-treated for 100 hours at 180° C. After 24 hours the Co concentration had not significantly changed through the thickness. At the completion of the 100 hours the Co concentration had become uniform throughout the overlay thickness. In practice the initial variable concentration of Co through the overlay thickness could be used to advantage in an engine. The lower Co content of the surface allowing a softer more conformable layer for initial running-in and bedding of the shaft and which gradually becomes slightly stronger with time and service of the engine.

The plating solution composition given above may be varied in the following ranges:
Stannous sulphate 25-200 gm/lit
Cobalt sulphate 20-160 gm/lit
Sodium heptonate 20-70 gm/lit
Acetic acid to bring pH to range 1.0 to 2.5

Solutions are commercially available for producing tin coatings and cobalt coatings by brush plating. Such solutions may be mixed in appropriate proportions to give a tin-cobalt alloy deposit.

The tin-cobalt overlay may be deposited by other plating means such as conventional vat electro-plating, sputtering, ion-plating and plasma spraying, for example. Such processes may further require the deposition of other interlayers such as, for example, in the case of conventional vat electro-plating, zincate activation and nickel or other interlayer. An example of a conventional vat electro-plating process is given below.

Vapour degrease bearings in trichloroethylene. Etch in a warm alkali solution based on sodium hydroxide for 1 minute at about 50° C. Remove smut from surface in a solution containing 10 vol.% sulphuric acid and 10 vol.% hydrogen peroxide for 30 seconds. Treat in conventional zincate solution for 45 seconds. Nickel plate for between 6 and 12 minutes depending on thickness required at $2\text{A/dm}^2$ in a Watts-type bath. Overlay plate with Sn-Co solution as described above at between 0.5 and $3\text{A/dm}^2$ depending upon composition required for the appropriate time. Rinses in between the various stages will of course be required.

The overlay of the present invention may be applied to strip from which bearings may subsequently be produced.

We claim:
1. An overlay alloy on a bearing, the overlay consisting of tin and between 0.5 and 15 wt% cobalt, apart from incidental impurities.
2. An overlay alloy as claimed in claim 1 comprising between 2 and 8 wt% cobalt.
3. A bearing having an overlay, the overlay consisting essentially of tin and between 2.0 and 15 wt% cobalt, apart from incidental impurities.
4. A bearing as claimed in claim 3 wherein the cobalt content is between 2 and 8 wt%.

* * * * *

UNITED STATES PATENT AND TRADEMARK OFFICE
CERTIFICATE OF CORRECTION

PATENT NO. : 4,795,682
DATED : January 3, 1989
INVENTOR(S) : MICHAEL TURNER; JOHN K. DENNIS; and DAVID R. EASTHAM It is certified that error appears in the above—identified patent and that said Letters Patent is hereby corrected as shown below:

On the first page of the patent (the information page), between items [22] and [51] the following information is added:

[30]  Foreign Application Priority Data

Jul. 19, 1986 [GB]  United Kingdom ......8617676

Signed and Sealed this

Twenty-fifth Day of July, 1989

*Attest:*

DONALD J. QUIGG

*Attesting Officer*  *Commissioner of Patents and Trademarks*